United States Patent
Hagan et al.

(10) Patent No.: US 8,491,194 B2
(45) Date of Patent: Jul. 23, 2013

(54) BEARINGS

(75) Inventors: Timothy J. Hagan, Succasunna, NJ (US); Vincent J. DiMartino, Clifton, NJ (US)

(73) Assignee: Saint-Gobain Performance Plastics Corporation, Aurora, OH (US)

(*) Notice: Subject to any disclaimer, the term of this patent is extended or adjusted under 35 U.S.C. 154(b) by 0 days.

(21) Appl. No.: 13/105,660

(22) Filed: May 11, 2011

(65) Prior Publication Data

US 2011/0211780 A1 Sep. 1, 2011

Related U.S. Application Data

(63) Continuation of application No. 11/865,250, filed on Oct. 1, 2007, now abandoned.

(51) Int. Cl.
*F16C 33/02* (2006.01)
(52) U.S. Cl.
USPC .......................................... 384/280; 384/278
(58) Field of Classification Search
USPC .................. 384/26, 29, 32, 37, 42, 139, 215,
384/275, 278, 280–282, 284–290, 293, 294,
384/536, 276, 97, 98, 220, 221, 277, DIG. 900,
384/DIG. 905
See application file for complete search history.

(56) References Cited

U.S. PATENT DOCUMENTS

| | | | |
|---|---|---|---|
| 1,384,173 A | 7/1921 | Wikander | |
| 2,247,995 A | 7/1941 | Ernst | |
| 2,266,319 A | 12/1941 | Hobbs | |
| 2,734,785 A | 2/1956 | Toulmin | |
| 2,938,754 A | 5/1960 | Lombard | |
| 3,449,032 A | 6/1969 | Scheufler | |
| 3,514,831 A | 6/1970 | Bruch et al. | |
| 3,539,232 A | 11/1970 | Batt | |
| 3,950,834 A | 4/1976 | Pitner | |
| 4,047,396 A | 9/1977 | McElwain et al. | |
| 4,322,879 A | 4/1982 | Warchol | |
| 4,533,262 A | 8/1985 | Pedersen | |
| 4,732,818 A | 3/1988 | Pratt et al. | |
| 5,216,811 A | 6/1993 | Jackson et al. | |
| 5,297,509 A | 3/1994 | Murphy | |
| 5,385,413 A | 1/1995 | Murphy et al. | |

(Continued)

FOREIGN PATENT DOCUMENTS

| | | |
|---|---|---|
| CN | 1035871 A | 9/1989 |
| CN | 1494638 A | 5/2004 |

(Continued)

OTHER PUBLICATIONS

International Search Report for PCT/US2007/005665 dated Aug. 2, 2007, 2 pgs.

(Continued)

*Primary Examiner* — James Pilkington
(74) *Attorney, Agent, or Firm* — Abel Law Group, LLP; Chi S. Kim

(57) ABSTRACT

In some embodiments, a bearing includes a substrate having a first portion and a second portion thicker than the first portion, the second portion having a curved outer contour. The bearing can further include a first layer on the outer contour of the substrate and/or a second layer on an inner contour of the substrate. The first layer can include a thermally conductive material, and the second layer can include a lubricious material.

25 Claims, 3 Drawing Sheets

U.S. PATENT DOCUMENTS

| | | | |
|---|---|---|---|
| 5,573,846 A | 11/1996 | Harig et al. | |
| 5,871,286 A | 2/1999 | Kern et al. | |
| 5,971,617 A | 10/1999 | Woelki et al. | |
| 6,258,413 B1 | 7/2001 | Woelki et al. | |
| 6,264,566 B1 | 7/2001 | Nieman et al. | |
| 6,289,590 B1 | 9/2001 | McDonald | |
| 6,357,918 B1 | 3/2002 | Kagohara et al. | |
| 6,373,066 B1 | 4/2002 | Penn | |
| 6,445,098 B1 | 9/2002 | Materne | |
| 6,461,679 B1 | 10/2002 | McMeekin et al. | |
| 6,520,859 B2 | 2/2003 | Beitzel et al. | |
| 6,609,830 B2 | 8/2003 | Bank et al. | |
| 6,685,360 B2 | 2/2004 | Murphy et al. | |
| 6,703,095 B2 | 3/2004 | Busshorff et al. | |
| 6,863,443 B2 * | 3/2005 | Mahling | 384/536 |
| 6,979,129 B2 | 12/2005 | Farbaniec et al. | |
| 7,025,679 B2 | 4/2006 | Menosky et al. | |
| 7,117,709 B2 | 10/2006 | Götzmann et al. | |
| 2002/0082092 A1 | 6/2002 | Beitzel et al. | |
| 2005/0087970 A1 * | 4/2005 | Ulintz | 280/775 |
| 2005/0169562 A1 | 8/2005 | Lee et al. | |
| 2006/0251887 A1 | 11/2006 | Welsch | |
| 2007/0212198 A1 | 9/2007 | Cordivari et al. | |
| 2007/0234839 A1 | 10/2007 | Cordivari et al. | |
| 2009/0087126 A1 | 4/2009 | Hagan et al. | |
| 2009/0224618 A1 | 9/2009 | Bhatti et al. | |
| 2011/0135232 A1 | 6/2011 | Hagan et al. | |

FOREIGN PATENT DOCUMENTS

| | | |
|---|---|---|
| DE | 102004016099 A1 | 10/2005 |
| EP | 168663 B1 | 11/1989 |
| EP | 0558282 A1 | 9/1993 |
| GB | 970392 | 9/1964 |
| GB | 1064597 A | 4/1967 |
| GB | 2136063 B | 2/1986 |
| GB | 2184200 A | 6/1987 |
| JP | 11148518 A | 6/1999 |
| JP | 3136303 B2 | 12/2000 |
| JP | 2001146924 A | 5/2001 |
| JP | 2001248657 A | 9/2001 |
| JP | 2006132708 A | 5/2006 |
| SU | 382201 | 5/1973 |
| WO | 02070908 A1 | 9/2002 |
| WO | 2007111810 A1 | 10/2007 |
| WO | 2009045953 A1 | 4/2009 |
| WO | 2011060043 A2 | 5/2011 |

OTHER PUBLICATIONS

International Search Report for PCT/US2010/056189 dated Aug. 2, 2011, 3 pgs.

International Search Report for PCT/US2008/078105 dated Dec. 9, 2008, 1 pg.

U.S. Appl. No. 11/386,461, filed Mar. 22, 2006, Inventors: Matthew A. Cordivari.

U.S. Appl. No. 12/943,474, filed Nov. 10, 2010, Inventors: Timothy J. Hagan.

Singh, P., Gupta, B.D., Kapur, V.K., A study of corrugated thrust bearings, (1993) Wear, 160 (1), pp. 13-26. Abstract Only.

Chen, W.W., Feng, Y.Y., Development and test of a new type of corrugated sheet thrust bearing, (1986) Machine Design & Research, (4, 1986), pp. 6-16. Abstract Only.

Singh, P., Gupta, B.D., Kapur, V.K., Optimization of corrugated thrust bearing characteristics, (1993) Wear, 167 (2), pp. 109-120. Abstract Only.

* cited by examiner

BEARINGS

CROSS-REFERENCE TO RELATED APPLICATIONS

This application is a Continuation of U.S. patent application Ser. No. 11/865,250, filed on Oct. 1, 2007. Each patent and patent application cited herein is hereby incorporated by reference in its entirety.

TECHNICAL FIELD

The invention relates to bearings.

BACKGROUND

Bearings can provide convenient means for rotatably, pivotably, or slidably fastening multiple members to one another in a low maintenance manner. Applications for bearings include those that have continuous rotational movement, such as journals for supporting a driven shaft. Bearings also can be used for applications that have repeated pivotal movement, such as automotive door hinges, door checks, and brake and accelerator pedals. Additional applications include those that have repeated reciprocal movement, such as automotive shock absorbers and struts. Bearings also can be used in lighter duty applications, such as multiple bar linkages used in the automotive industry for trunk deck lid and hood hinges. Low maintenance bearings can include a variety of configurations, such as, for example, bushes or journal bearings, thrust bearings or washers, locating pads, valve port plates, and wearing components for a variety of mechanisms. An example of a low maintenance sliding bearing includes a metal support and a plastic layer.

SUMMARY

The invention relates to bearings, such as those that can be used in high speed applications.

In one aspect, the invention features a bearing including a substrate having a first portion and a second portion thicker than the first portion, the second portion having a curved outer contour; and a first layer on an inner contour of the substrate. The first layer can include a lubricious material, such as grease.

In another aspect, the invention features a bearing including a substrate having a first portion and a second portion thicker than the first portion, the second portion having a curved outer contour; and a first layer on the outer contour of the substrate.

In another aspect, the invention features a bearing including a substrate having an inner surface, a first portion and a second portion thicker than the first portion, the second portion extending linearly for at least 25% of a length of the substrate; and a first layer on the inner surface of the substrate.

Other aspects, features, and advantages will be apparent from the description of the embodiments thereof and from the claims.

BRIEF DESCRIPTION OF DRAWINGS

These and other features of the present embodiments will be understood better by reading the following detailed description, taken together with the figures herein described.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Figure 1:
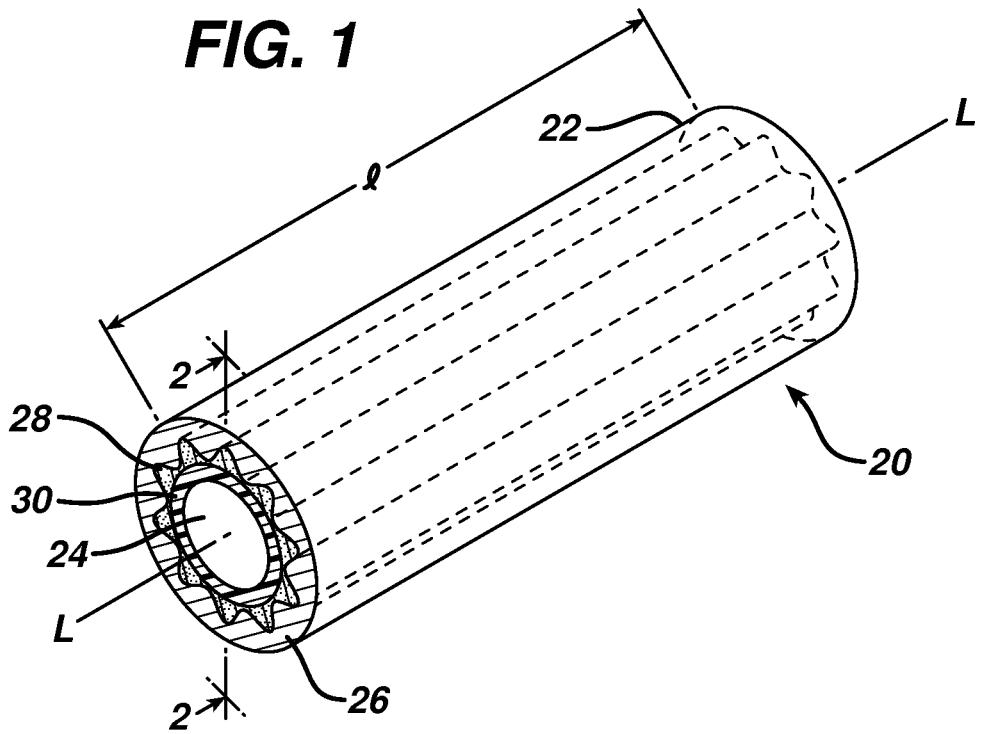
FIG. 1 is a perspective view of an embodiment of a bearing, configured in accordance with an embodiment of the present invention.
Figure 2:
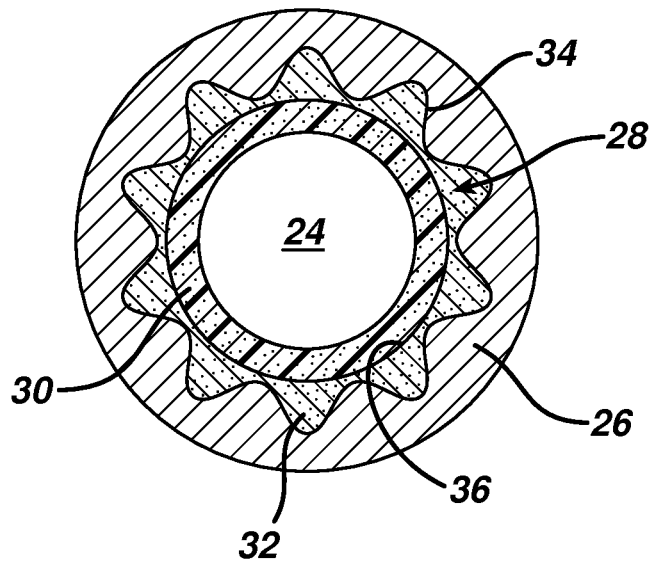
FIG. 2 is a cross-sectional view of the bearing of FIG. 1, taken along line 2-2, configured in accordance with an embodiment of the present invention.

Referring to FIGS. 1 and 2, a plain bearing 20 includes a cylindrical body 22 that defines a lumen 24 extending coaxially with a longitudinal axis (L) of the bearing. In use, bearing 20 can be placed in a housing, and lumen 24 can be used to receive, for example, a rotating shaft of a motor. Body 22 includes (e.g., is formed of) multiple (as shown, three) unitarily formed layers that enhance the performance of bearing 20. Starting with the outermost layer, body 22 includes a thermally conductive outer layer 26 that forms a cylindrical outer surface of bearing 20, a substrate 28, and a lubricious inner layer 30 that forms a cylindrical inner surface of the bearing. The lubricious material reduces friction and allows bearing 20 to be used for high speed applications (such as electric motors, transmissions, and reciprocating pumps). Thermally conductive outer layer 26 can reduce generation of heat during use.

Figure 3:
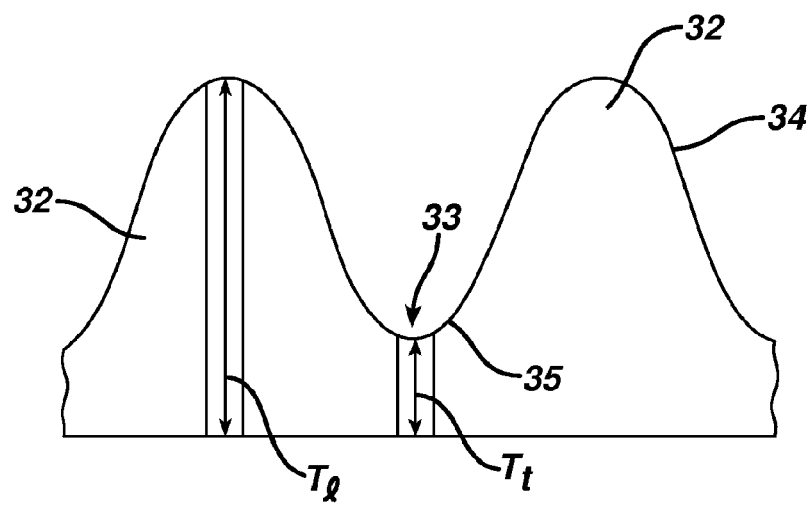
FIG. 3 is a diagram of an embodiment of a substrate, configured in accordance with an embodiment of the present invention.

Substrate 28 includes a plurality of lobes 32 that extend circumferentially and coaxially around longitudinal axis L. Substrate 28 provides bearing 20 with a mechanically strong support, and lobes 28 allow more thermally conductive material from outer layer 26 to be included in bearing 20. As shown, lobes 32 are curved projections that extend radially outward away from longitudinal axis L. Referring to FIG. 3, adjacent lobes 32 are spaced from each other and separated by a trough portion 33. Each trough portion 33 has a thickness $(T_t)$ that is less than a thickness $(T_l)$ of a lobe adjacent to the trough portion 33. Each lobe 32 has an outer contour 34 having at least one curved portion or segment (such as a curved outermost portion, e.g., the outermost 25%, 10%, 5%, 2% of a maximum thickness of a lobe), and an inner contour 36 whose curvature tracks the curvature of lumen 24. For example, outer contour 34 can include one or more curved portions that matches or substantially matches a portion of a circle, an ellipse, an oval, a parabola, or a non-linear and non-angular curve. In some embodiments, outer contour 34 includes one or more continuously curved portions in which two line segments (if any) on the outer contour cannot intersect at a point that is on the curved portion. In some embodiments, outer contour 34 has a radius of curvature ranging from approximately 0.5 mm to approximately 2.0 mm. Similarly, each trough portion 33 has a curved outer contour 35. As shown in FIG. 3, outer contour 35 is concave, while outer contour 34 of lobe 32 is convex. Outer contour 35 can include one or more curved portions that matches or substantially matches a portion of a circle, an ellipse, an oval, a parabola, or a non-linear and non-angular curve. In some embodiments, outer contour 35 includes one or more continuously curved portions in which two line segments (if any) on the outer contour cannot intersect at a point that is on the curved portion. Outer contour 35 can have a radius of curvature that is less than, substantially equal to, or greater than a radius of curvature of outer contour 34.

Figure 4:
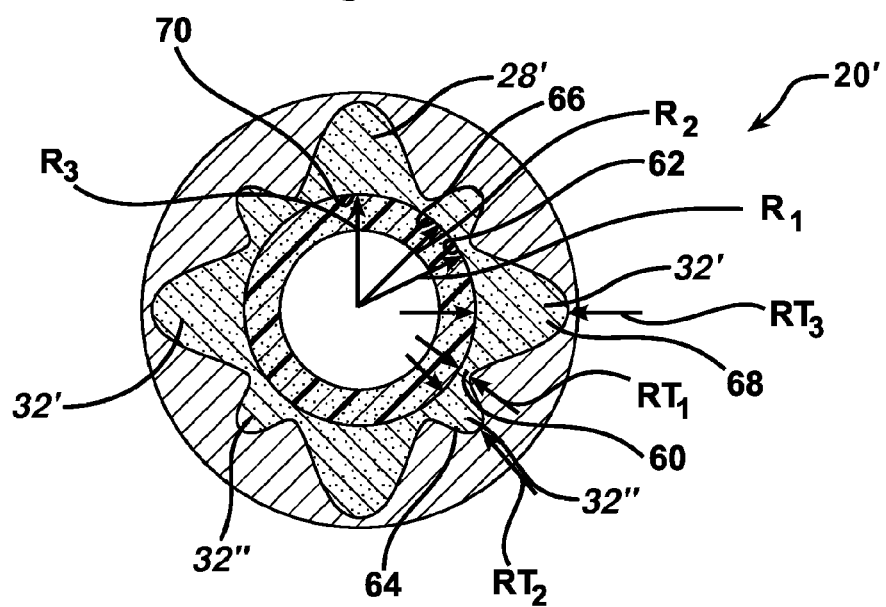
FIG. 4 is a cross-sectional view of an embodiment of a bearing, configured in accordance with an embodiment of the present invention.

The configuration of lobes 32 and substrate 28 can vary, depending on the intended application of bearing 20. For example, a substrate can include one or more lobes, such as two to more than twelve lobes. The number of lobes can be a function of, for example, the intended application for bearing 20, the thicknesses of the layers in the bearing, the materials included in the bearing, the geometry and size of the bearing, and/or the geometry and size of the member (e.g., spinning shaft) to be used with the bearing. Increasing the number of lobes can, for example, increase the surface area of the substrate that interacts with a housing and allow a higher load to be used with the bearing. Decreasing the number of lobes, for example, when the bearing will be used in low load applications, can allow more thermally conductive material to be included in the bearing and reduce friction and heat generation. In some embodiments, the number of lobes is determined by balancing the load requirements of the intended application and the reduction (e.g., minimization) of friction and heat generation. The lobes can be equally or unequally distributed around longitudinal axis L. As shown in FIG. 1, the lobes extend linearly and longitudinally parallel to longitudinal axis L for the entire length of substrate 28, which, as shown, matches the longitudinal length (l) of bearing 20. In other embodiments, the lobes extend for less than the entire longitudinal length (l) of bearing 20, for example, from approximately 25% to approximately 100% of length (l), from approximately 50% to approximately 100% of length (l), or from approximately 75% to approximately 100% of length (l). One or more lobes (for example, colinear lobes) can extend continuously or discontinuously along length (1). Referring to FIG. 4, in some embodiments, a bearing 20' includes lobes 32' of different dimensions. As shown, substrate 28' includes four lobes 32' and four thinner lobes 32". In a particular aspect, each adjacent pair of lobes 32', 32" of the substrate 28' can include a first portion 60 with a first radial thickness, $RT_1$, and an inner contour 62 with a first radius, $R_1$, a second portion 64 with a second radial thickness, $RT_2$, greater than the first radial thickness and an inner contour 66 with a second radius, $R_2$, and a third portion 68 with a third radial thickness, $RT_3$, greater than the second radial thickness and an inner contour 70 with a third radius, $R_3$. The second portion 64 and the third portion 68 each can have a convex outer contour. Further, the first portion 60 can separate the second portion 64 and the third portion 68. In a particular aspect, the first radius, the second radius, and the third radius are equal.

Figure 5:
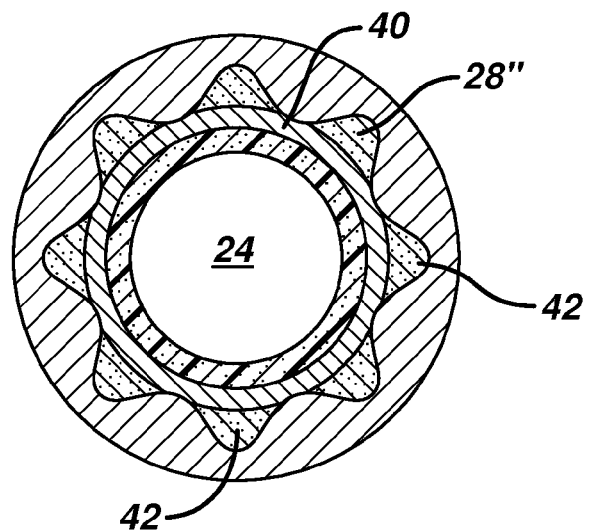
FIG. 5 is a cross-sectional view of an embodiment of a bearing, configured in accordance with an embodiment of the present invention.

Substrate 28 can include (e.g., be formed of) any material capable of providing bearing 20 with the mechanical and physical properties for the bearing to be used in its intended application. For example, substrate 28 can include one or more metals (such as aluminum), one or more alloys (such as steel, cold-rolled steel, stainless steel, conventional drawing quality sheet steel, and brass), one or more plastics, one or more ceramics, and/or one or more composites (such as one including glass and/or carbon fibers). Substrate 28 can include only one homogeneous composition (such as an alloy or a composite), or two or more discrete portions of different compositions. For example, referring to FIG. 5, substrate 28" includes an inner layer 40 having a first composition (such as a steel), and an outer layer 42 having a second composition (such as a porous bronze) different from the first composition. Other examples of a substrate include composites from a family of materials known as NORGLIDE® (e.g., NORGLIDE® PRO XL, available from Saint-Gobain Performance Plastics). These composites can include, for example, a steel backing and/or a reinforced mesh, and a layer of filled or compounded PTFE. The portions having different compositions can be arranged radially (FIG. 5) or circumferentially (e.g., adjacent lobes or portions thereof can have different compositions). The inner and outer surfaces of substrate 28, independently, can be untreated or treated to enhance the physical and/or chemical properties of the substrate. The surface(s) can be treated using techniques such as galvanizing, chromate or phosphate treatments, anodizing (e.g., for an aluminum substrate), laser melting or ablation, mechanical sandblasting and/or chemical pickling. For example, a surface can be modified using a discontinuous laser beam that selectively hits the surface and melts it over a relatively small area to create spaced craters. The craters can enhance adhesion between substrate 28 and lubricious layer 30.

Thermally conductive layer 26 can include (e.g., is formed of) one or more materials having a thermal conductivity equal to and/or greater than a thermal conductivity of a material included in substrate 28. The thermally conductive materials can have properties that allow layer 26 to be applied (e.g., laminated) to the material(s) included in substrate 28. Like substrate 28, thermally conductive layer 26 can include only one homogeneous composition, or two or more discrete portions of different compositions. The portions having different compositions can be arranged radially (e.g., FIG. 5) or circumferentially. Examples of thermally conductive materials include, but are not limited to, compressed powdered metal (e.g., copper), compressed powdered alloys, and compressed composites having thermally conductive fibers (e.g., metal fibers). In some embodiments, bearing 20 does not include thermally conductive layer 26 or any material disposed on the outer surface (e.g., outer contour 34 or outer contour 35) of substrate 28.

Lubricious layer 30 can include (e.g., be formed of) one or more lubricious materials, such as a material having a lower coefficient of friction than a material included in substrate 28. The lubricious materials can allow bearing 20 to be bored, broached, or burnished to size after installation without reducing the performance of the bearing. The lubricious materials can have properties that allow layer 30 to be applied (e.g., laminated) to the material(s) included in substrate 28. Like substrate 28, lubricious layer 30 can include only one homogeneous composition, or two or more discrete portions of different compositions. The portions having different compositions can be arranged radially (e.g., FIG. 5) or circumferentially.

Examples of materials in lubricious layer 30 include polymers or plastic materials, such as temperature-tolerant polymer systems containing high-melt-temperature polymers. Examples of polymeric materials include, but are not limited to, fluoropolymers (e.g., polytetrafluoroethylene (PTFE), fluorinated ethylene-propylene (FEP), polyvinylidene fluoride (PVDF), polychlorotrifluoroethylene (PCTFE), ethylene-chlorotrifluoroethylene (ECTFE), perfluoroalkoxy polymer (PFA), and other materials disclosed in U.S. Pat. No. 5,573, 846), acetals, polycarbonates, polyimides, polyetherimides, polyether ether ketones (PEEK), polyethylenes, polypropylenes, polysulfones (e.g., polyethersulfone), polyamides (Nylon), polyphenylene sulfides, polyurethanes, polyesters, polyphenylene oxides, PPS, $PPSO_2$, aromatic or aliphatic polyketone/ethers, PEI, and blends and alloys thereof.

In some embodiments, one or more additives (such as lubricants and/or fillers) are included in layer 30. The additives can affect characteristics of the material(s) in layer 30, such as lubricity, mechanical strength, wear resistance, thermal conductivity, and electrical conductivity. Examples of additives include, but are not limited to, glass and/or carbon fiber, silicone, graphite, molybdenum disulfide, aromatic polyester, carbon particles, bronze, fluoropolymer, and combinations thereof. The additives can be present in from approximately 0.5 to approximately 49.5 volume percent.

Other examples of materials in lubricious layers 30 include solid state materials (e.g., inorganic materials such as graphite and/or molybdenum disulfide) and viscous fluids (e.g., grease).

Bearing 20 can be fabricated using cladding and lamination techniques. In embodiments in which substrate 28 includes multiple discrete portions (e.g., layers), the substrate can be formed using cladding techniques, in which heat and pressure are applied to form a unitary structure (e.g., a sheet). Substrate 28, once formed, can be passed through a conventional calender roll having the negative of the selected pattern of lobes 32, or through a series of gears. Lubricious layer 30 and thermally conductive layer 26 can be applied subsequently to substrate 28 by laminating sheets of the selected material(s), such as PTFE. The entire laminate then can be inserted into a conventional press under heat and pressure to form a unitary body (e.g., a sheet). The body then can be formed into various application-specific configurations using conventional techniques to yield bearing 20. For example, the body can be formed into any number of bearing types, such as bushes or journal bearings, thrust washers, and skid plates. Bushes or journal bearings can be formed by cutting the unitary body into strips. Each of these strips, in turn, can be formed (e.g., rolled) into hollow cylinders. Certain bearings, such as cylindrical bearings, can be flanged using conventional techniques.

Other methods can be used to form a bearing. For example, a bearing can be fabricated by forming a substrate into a selected configuration, such as, for example, a cylinder, prior to application of the lubricious layer. The substrate can be provided with lobes as described herein, and then fabricated into a cylinder. Thereafter, the lubricious layer can be applied to the cylinder by methods such as, for example, spray coating, painting, or dipping. Application of the lubricious layer can be performed before or after flanging one or both ends of the cylinder. As another example, the substrate can be fabricated into a cylinder by a conventional method such as hot or cold forming operations, including roll forming, piercing, drawing, or extrusion processes to produce either seamed or seamless cylinders. The lobes can be provided using, for example, a chemical etching process or laser treatment. The lubricious layer can be applied to the cylinder as previously described.

Figure 6:
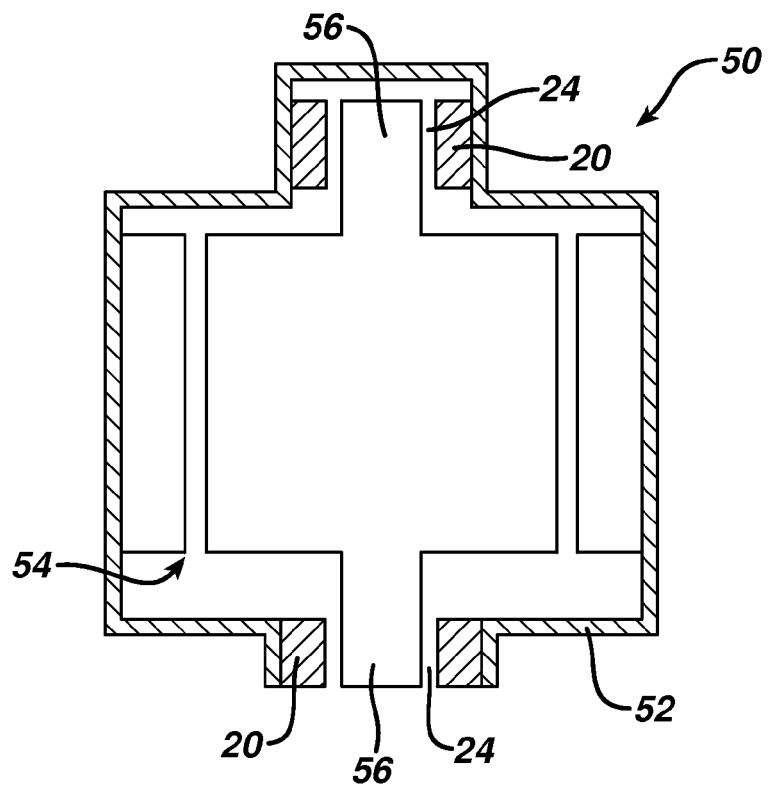
FIG. 6 is a diagram of a system including a bearing and a motor, configured in accordance with an embodiment of the present invention.

In use, the bearings described herein can be placed between a housing and a movable member. Referring to FIG. 6, a system 50 includes a housing 52, a motor 54 having a rotatable rotor 54 in the housing, and bearing 20 in the housing. As shown, bearing 20 is positioned between rotor 54 and housing 52, specifically, with the rotor in lumen 24 of the bearing. Bearing 20 is capable of reducing motor vibrations, which can result in quieter motor operation and increased motor life. In some embodiments, bearing 20 is used to replace bushings and ball bearings in electric motors, e.g., those under one horsepower. In other embodiments, the bearings described herein are used in applications in which a pivotable member (e.g., a shaft) is placed in a lumen of a bearing.

In some embodiments, a bearing includes one or more intermediate layers between substrate 28 and inner layer 30. The intermediate layer can, for example, enhance adhesion or bonding between substrate 28 and layer 30. The intermediate layer can include, for example, an adhesive such as fluoropolymers such as PFA, MFA, ETFE, FEP, PCTFE, and PVDF, curing adhesives such as epoxy, polyimide adhesives, and/or lower temperature hot melts such as ethylene vinylacetate (EVA) and polyether/polyamide copolymer (Pebax®).

The curved lobes described herein can be used in combination with structures that are not curved, such as raised structures described in U.S. Pat. No. 5,971,617 (Woelki et al.). The raised structures can include linear segments that intersect at a point on the outer contour of the structures.

In some embodiments, lubricious layer 30 is perforated for additional lubrication by grease pockets disposed therein.

All references, such as patents, patent applications, and publications, referred to above are incorporated by reference in their entirety.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A bearing comprising:
a metal substrate comprising an outer contour and a first portion having a first radial thickness and an inner contour having a first radius, a second portion having a second radial thickness greater than the first radial thickness and an inner contour having a second radius, and a third portion having a third radial thickness greater than the second radial thickness and an inner contour having a third radius, wherein the second portion and the third portion each have a convex outer contour and the first portion separates the second portion and the third portion and wherein the first radius, the second radius, and the third radius are equal; and
a first layer on the outer contour of the substrate.

2. The bearing of claim 1, wherein the substrate comprises a plurality of first portions spaced from each other, a plurality of second portions spaced from each other, and a plurality of third portions spaced from each other.

3. The bearing of claim 2, wherein the first portions, second portions, and third portions extend linearly for at least 25% of a length of the substrate.

4. The bearing of claim 2, wherein the first portions, second portions, and third portions are positioned around a longitudinal axis of the bearing.

5. The bearing of claim 1, wherein the substrate comprises a plurality of discrete layers having different chemical compositions.

6. The bearing of claim 1, wherein the first layer comprises a material having a higher thermal conductivity than a material of the substrate.

7. The bearing of claim 1, wherein the first layer contacts the substrate.

8. The bearing of claim 1, further comprising a second layer on an inner contour of the substrate.

9. The bearing of claim 8, wherein the second layer comprises a material having a lower coefficient of friction than a material of the substrate.

10. The bearing of claim 8, wherein the second layer contacts the substrate.

11. A system, comprising:
a bearing of claim 1, the bearing having a lumen;
and a movable member in the lumen.

12. The system of claim 11, further comprising a motor comprising the movable member.

13. A bearing, comprising:
a metal substrate comprising a continuous, cylindrical inner surface, a first portion, a second portion thicker than the first portion, a third portion thicker than the second portion, the first portion separating the second portion and third portion, the second portion extending linearly and longitudinally parallel to a longitudinal axis for at least 25% of a length of the substrate; and
a first layer on the inner surface of the substrate.

14. The bearing of claim 13, wherein the second portion extends for at least 50% of the length of the substrate.

15. The bearing of claim 13, wherein the second portion extends for at least 75% of the length of the substrate.

16. The bearing of claim 13, wherein the substrate comprises a plurality of first portions spaced from each other, a plurality of second portions spaced from each other, and a plurality of third portions spaced from each other.

17. The bearing of claim 16, wherein the first portions, the second portions, and the third portions have curved outermost contours.

18. The bearing of claim 13, wherein the substrate comprises a plurality of discrete layers having different chemical compositions.

19. The bearing of claim 13, wherein the first layer comprises a material having a lower coefficient of friction than a material of the substrate.

20. The bearing of claim 13, wherein the first layer contacts the substrate.

21. The bearing of claim 13, further comprising a second layer on an outer surface of the substrate.

22. The bearing of claim 21, wherein the second layer comprises a material having a higher thermal conductivity than a material of the substrate.

23. The bearing of claim 21, wherein the second layer contacts the substrate.

24. A system, comprising:
a bearing of claim 13, the bearing having a lumen;
and a movable member in the lumen.

25. The system of claim 24, further comprising a motor comprising the movable member.

* * * * *